FIG. 2A

Dec. 26, 1950 T. S. SKILLMAN 2,535,461
ARTICLE DISPENSING SYSTEM
Filed Oct. 6, 1947 5 Sheets-Sheet 3

FIG. 2B

Inventor:
Thomas S. Skillman
By Ward, Crosby & Neal
Attorneys

FIG. 3A

Inventor:
Thomas S. Skillman.
By Ward, Crosby & Neal
Attorneys.

FIG.3B

Patented Dec. 26, 1950

2,535,461

UNITED STATES PATENT OFFICE 2,535,461

ARTICLE DISPENSING SYSTEM

Thomas S. Skillman, Mosman, near Sydney, New South Wales, Australia, assignor to Punch Engineering Pty. Limited, Cammeray, near Sydney, New South Wales, Australia, a company of New South Wales, Australia Application October 6, 1947, Serial No. 778,195
In Australia October 14, 1946

11 Claims. (Cl. 235—61)

The invention relates to systems for dispensing articles and particularly to arrangements in said systems related to the prices of the articles selected from storage.

In article dispensing systems it is necessary to inform the customer or shop assistant of the total cost of the selected articles.

It has been proposed to use price printing and adding machines for this purpose but these arrangements are very complicated and furthermore cannot give an indication of the total of the prices of selected articles while the selection is still in progress.

According to the invention these disadvantages are overcome by adding means for adding up the prices of the articles designated for dispensing in combination with announcing means to announce to an operator the total of the added up prices of the designated articles before their delivery.

According to a further feature of the invention, the announcing means announce progressively the total of the added up prices of selected articles.

According to another feature of the invention, a message register indicates the total of all the articles selected during a special time period, thus giving a check on the sales.

Another feature of the invention is the provision of a lamp indicator which announces the total of the added up prices of one order. This indication is cleared immediately after payment so that the indicator is then free for the next order.

According to a further feature of the invention, adding switches and other parts are provided in several sets to ensure that any failure in one of these parts does not affect the proper price indication.

According to another feature of the invention, the adding switches are provided with special banks so connected that an immediate alarm is given in case of failure of one of these switches.

These and other features of the invention will be more clearly understood from the following description in connection with the drawings which show schematically one embodiment of the invention.

Figure 1:
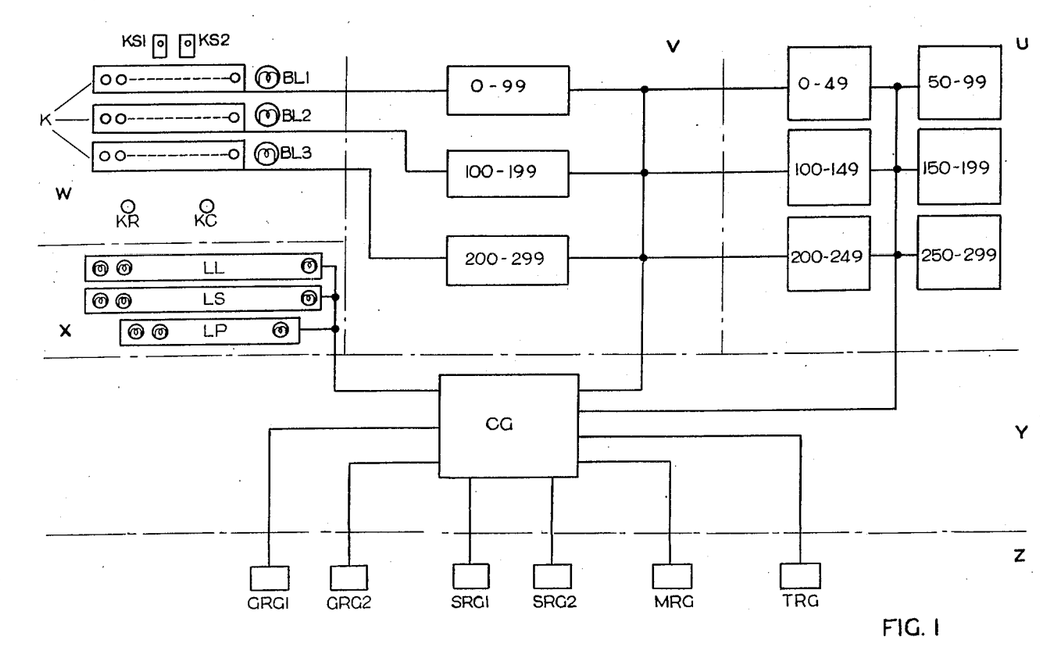
Fig. 1 shows schematically one embodiment of the invention.

In Fig. 1 a number of shelves U are provided, which contain the articles with the stock numbers as shown in Fig. 1. These shelf groups are electrically connected with selecting groups V which contain the necessary relays for the selection of the wanted articles. The counting and the pricing of the articles is carried out by a pricing unit Y which contains the counting group CG. Registers Z are connected with the counting group CG and comprise, for example, storage group registers GRG1 and GRG2, salesmen registers SRG1 and SRG2, a special purposes register MRG which can be connected for any special purposes and a register TRG for the grand total.

The selection of an article is made from the operator's position W. A number of key sets K, each one comprising 10 keys, is used in this example. It must be understood that one single key set can be used for the selection of all articles.

Each key set K is fitted with a supervisory or busy lamp BL and switches KS1 and KS2 can be thrown to separately register sales made by two different salesmen. As many keys KS as salesmen are present can of course be provided. KR is a release key whose special functions will appear later on and KC is an "order complete" key which is pressed whenever an order is completed.

The indication of the amount of money relating to the articles selected is given by a lamp indicator X which provides three rows of lamps LP, LS, LL designating the penny, shilling and pound amounts.

The arrangements for the discharge of the articles and for their transportation to a special locality are not shown in the drawings.

Figure 2A:
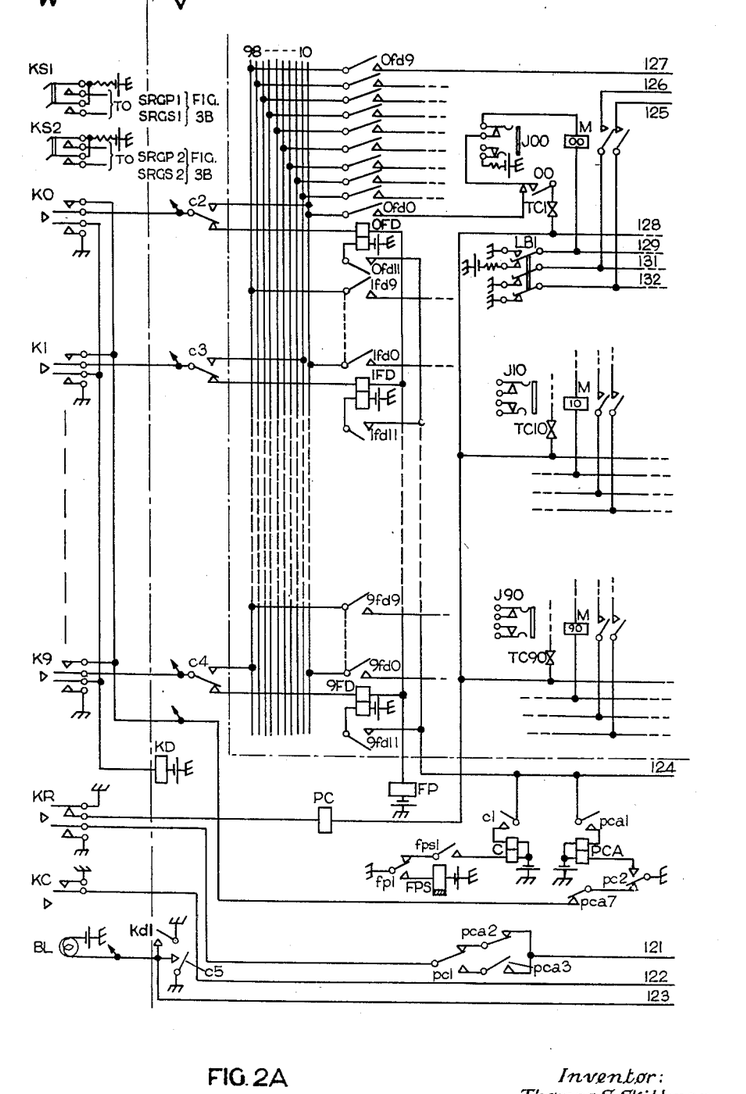
Figs. 2A and 2B show details of the circuits for the selecting group of Fig. 1.
Figure 2B:
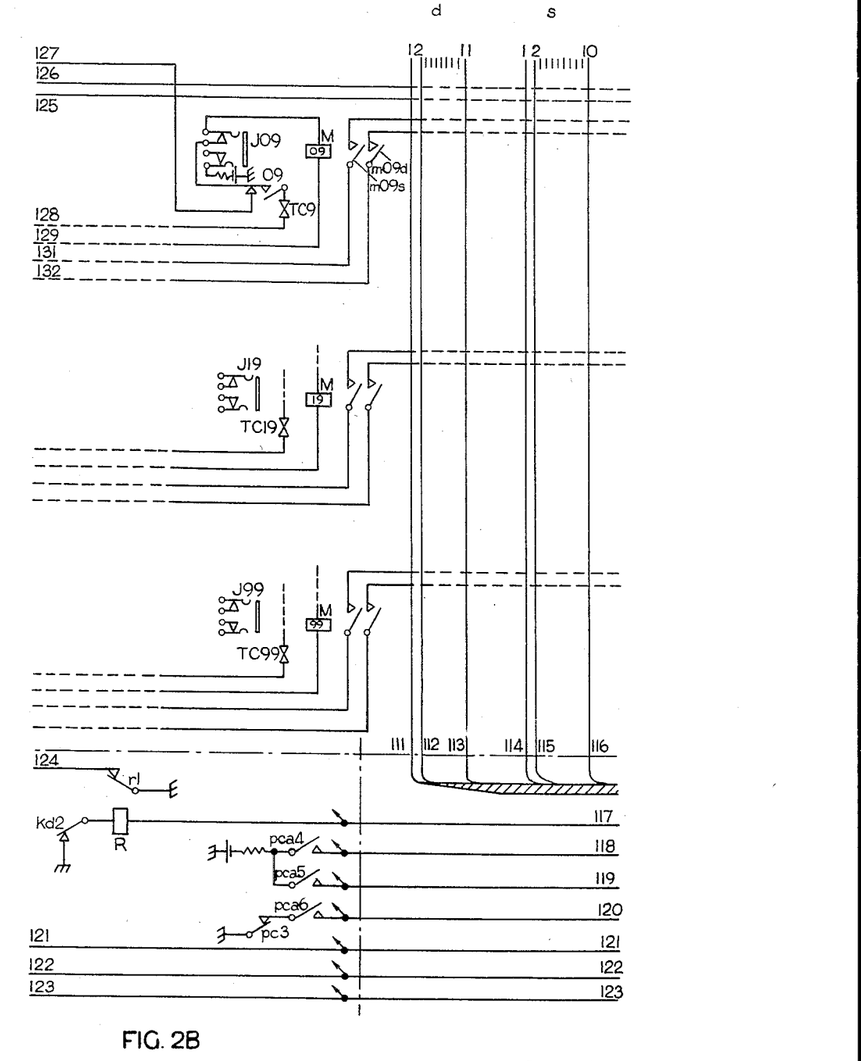

Figs. 2A and 2B show the operator's position W, the selector group V and the shelf grouping U. When the operator receives a ticket listing several stock numbers for articles to be selected, she keys the first of these up on the key board pressing the keys relating to the digits of the stock number, one after the other. As soon as this selection is completed the lamp BL lights up, and a further selection can be made as soon as this lamp goes out again. At the same time, the price of the special item appears on the price indicator as will be described later on in detail. This price indicator announces the total of the added up prices for the items selected so that the total of one order can be seen after the selection of this order has been completed. When the order is complete, the operator presses the key KC after having noted on the ticket the total amount appearing on the price indicator. The "order complete" key KC clears the pricing unit, apart from the registers which add up the total sales, and restores the price indicator to 0. The busy lamp BL can be so connected that it is kept alight from a timing circuit for a certain time to make sure that the complete order is properly dispensed before it gives the clearance for the selection of a new order. This time period does not mean any delay in the working of the whole system as normally the operator will be busy in checking up the articles for the selected order.

The switching operations which occur when a selection of articles is made are described now in detail. When the operator presses, for example, the key K0 to select a stock number starting with 0, the relay 0FD is energised over key K0, contact $c2$, relay 0FD, relay FP to battery. The relay 0FD closes a circuit for itself over its second winding, its contacts of $d11$, lead 124 and the contact $r1$ so that this relay remains energised when the operator removes her finger from the key K0.

When relay FP is energised in series with relay 0FD it closes the circuit for the slow release relay FPS over the contact $fp1$. This relay operates and prepares a circuit for relay C over the contact $fps1$. As soon as the relay FP releases, when the operator has released the key K0, relay C is energised over the back contact $fp1$ and closes the circuit for its second winding over contact $r1$, lead 124 and contact $c1$. Relay C switches the connections from the various keys over from the relays 0FD ... 9FD to the connection with the various contacts of these relays. As shown in Fig. 2A, for example, contact $c2$ switches the key K0 from relay 0FD to the contacts $0fd0$, $1fd0$, $2fd0$ and so on. Contact $c3$ fulfils a similar switching operation for the key K1. Over the contact $c5$ the busy lamp BL lights up.

When the operator now presses one of the keys again for the selection of the second digit and thus for the selection of the respective article a circuit is closed from the key over one of the contacts $c$ and the contact $fd$ of the FD relay operated before. If, for example, the second digit is the digit 9 and the key K9 is pressed, a circuit is closed via the contact $c4$, the contact $0fd9$ of relay 0FD, lead 127, the contact 09 (Fig. 2B) jack J09, the magnet M09, lead 129 and the loading bar contact LB1 (Fig. 2A) to battery.

The magnet M09 operates for example the driving means of a movable belt on which the articles belonging to the shelf with the digits 09 are stored. At the same time, the magnet operates its contact 09 disconnecting the circuit from the key set and establishing a new circuit via contact 09, trip contact device TC9, lead 128, relay PC (Fig. 2A) and release key KR to earth.

The two contacts $m09s$ and $m09d$ extend earth from contacts LB1 (Fig. 2A) over wires 131 and 132, to the value translating device shown on the right hand side of Fig. 2B.

This device consists of a row of 21 vertically-disposed bare wires, six of which are shown in Fig. 2B by the numbers 111–116. Each vertical wire represents a value in a particular denomination. For example, wire number 111 represents one penny, wire number 112 represents two pence, wire number 115 represents two shillings and so on.

The wires 131 and 132 are connected to the vertical wires appropriate to the price of the particular article delivered by the associated magnet M09. These connections are made so as to permit easy changing to any one of the vertical wires when changes are to be made in the price of the article.

When earth from LB1 is extended through contacts $m09s$ and $m09d$ this earth is passed on to the appropriate vertical wires 111–116 and thus energises one of the relays in the group 1P-11P (Fig. 3A) and one relay in the group 1S-11S (Fig. 3A), thus registering the price of the article in these relay groups.

The prices are thus registered whether an article is released or not; and the amount registered controls the adding in the pricing unit, which will be described later in the specification. In the arrangement of the invention shown in the diagrams, this adding will take place only if an article is released and strikes contacts TC9.

Over the circuit described before relay PC operates and over its contact $pc2$ energises the relay PCA which closes the circuit over its second winding, its contact $pca1$, lead wire 124 and contact $r1$. The contact $pc2$ takes earth away from the key set so that further pressing of the keys is without any effect. Further interruption of this circuit occurs through the contact $pca7$. The function of the contacts $pc1$, $pca2$ and $pca3$ (Fig. 2A) and $pc3$, $pca4$, $pca5$ and $pca6$ (Fig. 2B) will be described later on.

The relay PC and the relay PCA are used to give an indication when the circuit for a magnet and thus a clutch has operated and when it has released. The articles discharged from a shelf operate a trip contact TC for example TC9, and thus release relay PC. The following conditions can occur.

Relay PC and relay PCA released indicates that the clutch magnet has failed to operate.

Relay PC operated and relay PCA operated indicates that the clutch has operated but that the trip contact has not functioned, which means that no article has been released.

Relay PCA operated and relay PC released indicates that a package has been released and at the same time earth is applied to the pricing unit via the contacts $pc3$ and $pca6$.

The removal of earth from the key set through the operation of the relays PC and PCA fulfils a very vital function as otherwise the operator, if she held the key down too long after PC has been de-energised, could operate the clutch magnet again and thus would release a number of articles. The relay PCA operates the group register via its contacts $pca4$ and $pca5$, as will be described later on.

Whenever one of the keys of the key set is operated, relay KD closes a circuit for the busy lamp BL over contact $kd1$ and at the same time removes earth at the contact $kd2$ from the release relay R. This function prevents the circuit from being restored at the end of the cycle should the operator still keep the key depressed, as otherwise a depressed key would select the first digit of the next cycle.

When an article is released and when its price has been indicated, as described later on, earth is applied to the relay R from the pricing unit Figs. 3A and 3B. Relay R operates and by opening its contact $r1$ interrupts the circuit for the relays which were blocked before, namely the relays FD, C and PCA and thus restores all circuits to their initial position.

Figure 3A:
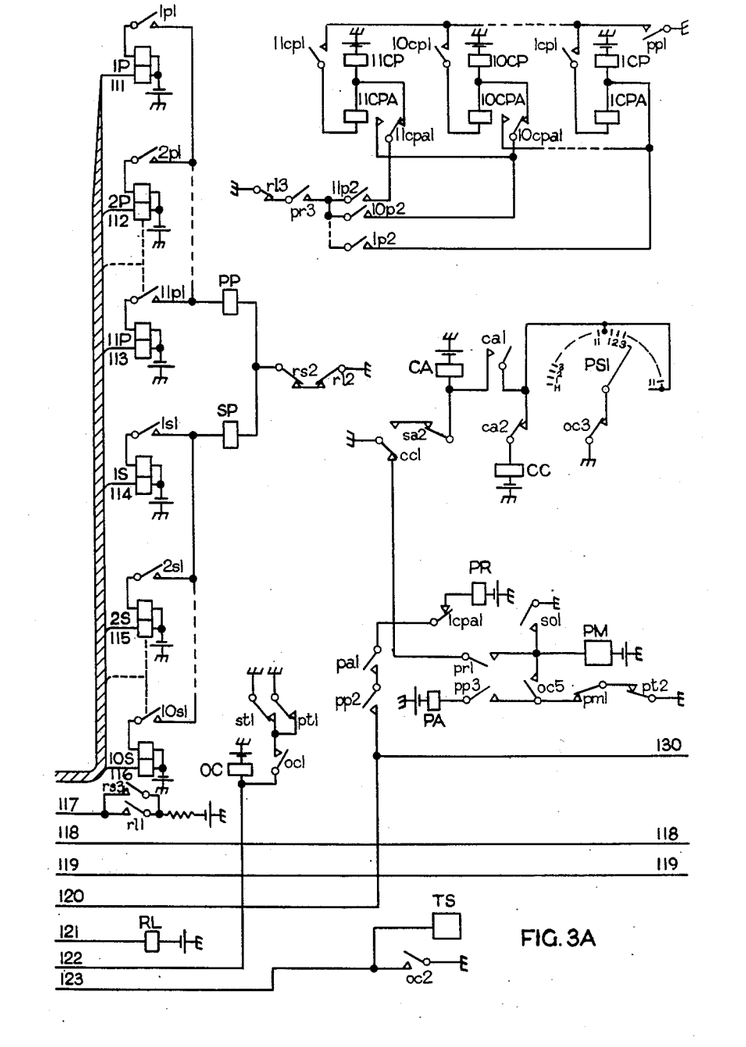
Figs. 3A and 3B show details of the circuit for the pricing unit of Fig. 1.

If the circuit jams at any stage so that the busy lamp BL does not go out in a reasonable time after the operator has pressed the keys, the operator presses a release key KR which energises over lead 121 a release relay RL in the pricing unit Fig. 3A. If this is ineffective, because a condition exists in which the relay PC is released and relay PCA is operated, this indicates that some of the articles have already been released and in this case the unit goes out of action and an emergency condition exists. Normally, however, this could only occur due to some fault in the individual shelf concerned, resulting in either relay PC being operated and staying in that condition or failing to operate at all. The former condition would arise whenever a shelf was empty and in this case, the operator would mark on her ticket that the item was not received and then proceed with the selection of the next item. Relay RL in Fig. 3A prevents the recording of any price when it is operated and at the same time operates via its contact rl1 and lead 117 relay R (Fig. 2B) to restore the circuit.

In order to load the movable belts in the bins with the respective articles a lever is operated which raises a loading bar at the output end of the belts and operates a loading bar switch, for example, LB1 (Fig. 2A) to prevent any articles from being delivered. The loading bar switch can be common to each row of shelves and is not tied up with the special arrangement of the shelves themselves. When the loading bar switch is operated, jacks J00, J01 etc., are exposed to view and the operator pushes a dummy plug into the jack corresponding to the shelf which is to be loaded. The plug is so connected that by plugging in it first separates the break contacts of the jack and then connects the two springs so that the battery is directly connected with the magnet, for example M00, which thus is operated disconnecting the contact 00 and the trip contact TC1. The movable belt of the respective shelf is running and slipping underneath the articles which are pushed on to it to fill up the shelf. The articles are carried forward to the raised loading bar until the whole belt is filled up. When this function is completed the plug is pulled out of the jack, the loading bar is lowered and the loading bar switch LB1 goes back to its initial position thus restoring the arrangement for further selection.

Figure 3B:
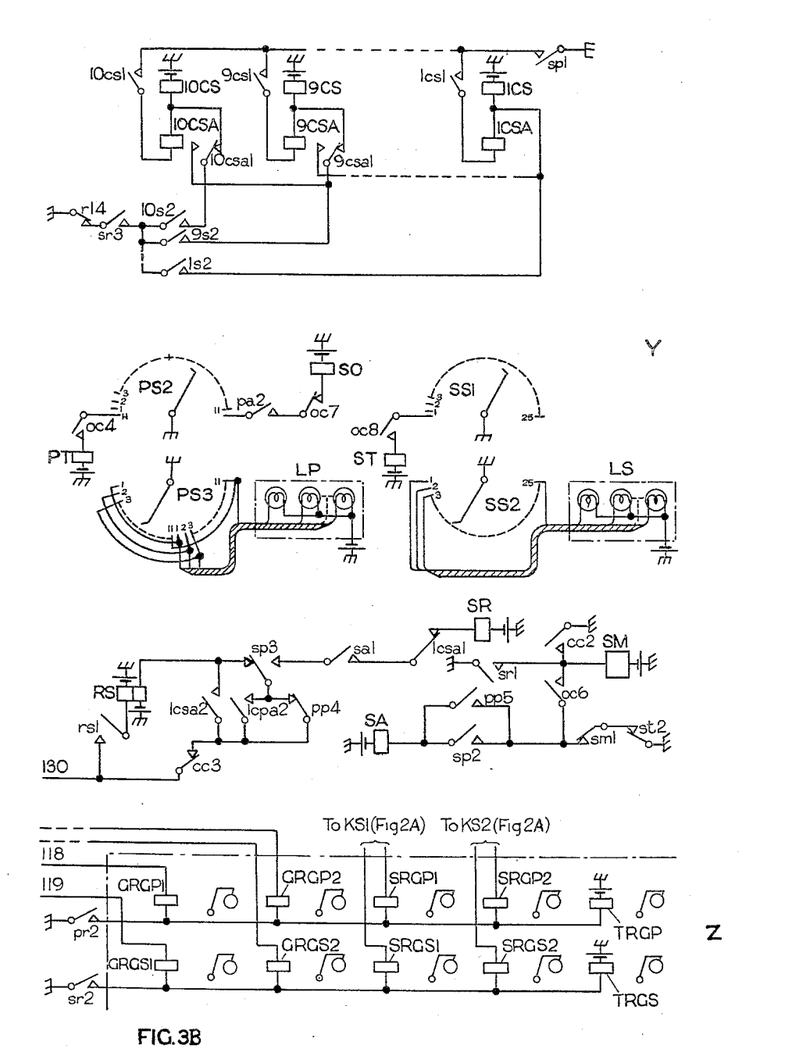

The pricing unit is shown in Figs. 3A and 3B. The various wires for the pence and shilling amounts are connected with the respective pricing relays IP to IIP and IS to I0S. Whenever a price is marked on the respective wires through the contacts of a clutch magnet, one of these relays is energised and closes a circuit over its second winding, its own contact, the relay PP and relay SP respectively and the contacts rs2 and rl2. These relays remain energised until either the relay RL or the relay RS operates for final release. The function of the penny relays IP to IIP is to mark a certain position on the pennies counting relay train consisting of the relays ICP, ICPA to IICP and IICPA. These relays function as a step by step switch and a rotary step by step switch can be used in place of them using a contact of the P relays to mark a certain terminal at the switch and to arrange for the switch automatically to hunt as far as that terminal. The relay group functions slightly quicker because it is ready to start counting out as soon as the contacts for the relays IP, 2P, etc., are closed. The operation of this counting group follows the well known method whereby an earth received from relay PR over contact pr3 and the contact of one of the relays IP to IIP energises a particular CP relay which is thus marked and at the same time prepares a new circuit for itself and the particular CPA relay. The CPA relay cannot operate as earth is applied to both terminals. When relay PR opens its contact pr3 this short circuit at the CPA relay is removed and this relay operates in series with the CP relay and changes over the control circuit to the next CP and CPA relay so that the next closure of relay PR will repeat the process with the next PC relay in the train. If, for example, relay IP is energised one closure and opening of relay PR is enough to operate relay ICPA indicating the end of the counting period. If, on the other hand for example, relay I0P operates then 10 closures and openings of contact pr3 are necessary to energise the relay ICPA. The intermittent operation of relay PR is used at the same time to step up the penny switch and then to count the number of pennies marked.

The shilling relays IS to I0S, the shilling pilot relay SP and the shilling counting train (relays CS and CSA) function in exactly the same manner as described above for the penny relays and penny counting train, except of course that they are associated with the contact of relay SR (which also influences the shilling switch) instead of relay PR.

Two separate switches are provided, the penny switch with the banks and wipers PS1, PS2, PS3 and the shilling switch with the banks and wipers SS1, SS2. If necessary, a pound switch can be provided which works on the same principle as the penny and shilling switch and which can be stepped up whenever the shilling switch reaches the 20/– mark in the same way as will be described later on for the transfer of indications from the penny switch to the shilling switch.

The operating magnet for the penny switch, magnet PM, stepping up the penny switch, is operated when earth is applied from the selecting relay group U (Figs. 2A and 2B) via the back contact pc3 and the front contact pca6 over the lead 120. When the relay PP is energised, relay PA is operated via the contacts pt2, pm1 and pp3. When earth is applied to lead 120, PR relay operates over the contacts pp2, pa1 and Icpa1. Relay PR closes its contact pr1 and thus operates the magnet PM from earth via the contact cc1. Relay PA is introduced in the circuit to slow down the movement of the switch wipers. When magnet PM operates for the first time it opens its contact pm1, interrupts the circuit of relay PA which in its turn interrupts the circuit for relay PR and thus releases the magnet PM and the whole cycle of operation starts over again.

The operation of relay PR transmits pulses via the contact pr3 to the penny counting train until the counting out is completed as described above. In the latter case, the circuit for relay PR is interrupted by the opening of the contact Icpa1.

The stepping up of the shilling switch operates in the same manner as described before, corresponding relays having the same designation except for the prefix "S" instead of "P."

Whenever the penny switch reaches the position which would correspond to twelve pennies, it energises the relay CC over the wiper and bank PS1. The function of this relay is to stop the penny switch for a moment while the shilling switch is stepped on one step. This is achieved by removing the earth from the magnet PM at the contact cc1. At the same time, the operating magnet SM for the shilling switch is energised over the contact cc2. The magnet SM opens the circuit for the relay SA which has been energised before and this relay closes the circuit for the relay CA over the front contact cc1 and the back contact sa2. The relay CA then locks itself over the wiper of PS1 and its own contact ca1. Over the contact ca2 relay CC is released again and in doing so the magnet PM is stepped up again provided that more pennies have to be registered. As soon as the penny switch steps further up, the circuit for relay CA is interrupted and this relay releases again.

To enable the penny switch to get over the unwanted 25th terminal of a usual switch, the relay SO is connected with the bank and wiper PS2. This relay closes the circuit for the magnet PM over its contact so1, thus stepping the switch forward to automatically pass this last terminal.

Indicating lamps of the indicator X (Fig. 1) are shown only diagrammatically in Fig. 3B. The penny lamps LP are connected with the third bank PS3 of the penny switch and the indicating lamps LS for the shilling amounts are connected with the second bank SS2 of the shilling switch. Indicating lamps for pound amounts would be connected in the same manner. Earth connected to the wipers of these switches lights up the lamps according to the position of the wiper.

When the pricing is completed for one of the selected items, and when the penny and shilling counting trains have been counted out, the relay RS is operated over the leads 120 and 130 and the contacts 1csa2, 1cpa2 of the counting train relays. Relay RS closes the circuit for its second winding over the contact rs1, and over the contact rs3, puts battery on the lead 117 which operates the release relay R (Fig. 2B). The circuit for the penny and shilling relays is interrupted by the opening of the contact rs2 and thus this circuit is restored to normal.

When the order is completed, the operator presses "order complete" key KC (Fig. 2A) and this puts earth on lead 122 and operates relay OC (Fig. 3A). This relay closes the circuit for itself via the contacts st1 and pt1 in parallel and its own contact oc1. Over the contacts oc5 and oc6 a direct circuit is completed for the magnets PM and SM to move the two switches rapidly back to their initial position by self-interruption. As soon as the penny and shilling switches have reached their initial positions, the relays PT and ST are operated via the contacts oc4 and oc8. These relays open the circuit for relay OC which releases and thus all the circuits are now restored to normal so that a new selection can be made. During this operation the busy lamp BL (Fig. 2A) is kept alight while earth is applied to lead 123 (Fig. 3A) over the contact oc2. Parallel to the contact oc2 is connected a time switch TS which keeps the busy lamp BL alight for a certain time period, for example ten seconds, to ensure that all the goods associated with the first order have been carried through to the delivery position.

As mentioned before, a release relay RL (Fig. 3A) is provided which can be operated via the lead 121 by pressing the release key KR (Fig. 2A). This release relay interrupts the circuit for the penny and shilling relays at contact r12 and the circuits for the counting trains at the contacts r13 and r14. At the same time it applies battery to the lead 117 over contact r11 to operate the release relay R (Fig. 2B).

A series of message registers are provided of a type used for call metering in telephone networks. Each operation of the register magnet steps a wheel forward for one step and these wheels are connected in speedometer fashion so that the total number of operations is counted. Printing devices can be connected with these registers to provide a printed record. Stepping up of these registers is performed by the operation of the relays PR and SR whose respective contacts pr2 and sr2 put earth on the registers. Registers for different purposes are used as mentioned above in connection with Fig. 1. The registers TRGP and TRGS register the grand total of pennies and shillings. To register sales made by certain salesmen, the registers SRGP1 and SRGS1 and the register SRGP2 and SRGS2 are connected with the keys KS1 and KS2 respectively at the operator's position W (Fig. 2A). Whenever a selection is made the operator throws the key for the respective salesman so that the sale is registered on his individual register. Furthermore, special groups of articles can be registered via the group registers GRGP1 and GRGS1 or GRGP2 and GRGS2 and so on. These registers are connected via leads 118 and 119 with the contacts pca4 and pca5 (Fig. 2B) which belong to one of the selecting groups.

Corresponding contacts of other selecting groups are connected in the same way with the corresponding registers, for example GRGP2 and GRGS2.

The group registers as shown, do not provide for an indicating of the totals in £. s. d. but in so many shillings and so many pennies as has been set up by the pricing unit. No difficulty, however, exists to convert these amounts into £. s. d. if this is considered necessary.

To safeguard against failure a fourth bank can be added to the penny switch and a third bank to the shilling switch and the whole circuit could be duplicated. A circuit is then formed through the extra bank of say the two penny switches in series and if ever the two switches get out of step a relay would fall off in series with that circuit and would give an alarm to indicate that an error has occurred. In any installation of a reasonable size it is practical to duplicate the pricing unit so that maintenance can be carried out during office hours and that in case of trouble a second unit can be switched in. In this case, the two circuits would be connected in parallel which can easily be achieved by paralleling all the wires connected to the shelf groups and the relay circuits with only minor variations in the connection. In case one of the circuits fails, an immediate alarm would be given and by throwing a switch the faulty circuit can easily be isolated.

Similar arrangements can be made to provide two groups of message registers so that any discrepancy occurring between them would immediately indicate that one or the other circuit was incorrect and by checking from their records, the correct one can easily be found. If necessary, each message register can be duplicated or three can be connected in parallel. If in the latter case, one register differs, it can be safely assumed that the indication given by the two other registers is the correct one.

Reference is made to the co-pending application of Thomas Samuel Skillman and Peter Lincoln Law, Serial No. 95,496, filed May 26, 1949, and relating to the subject matter of this application.

I claim:

1. A system for dispensing articles of varied character, comprising: a plurality of storage devices, each including an electrically operated releasing means for dispensing stored articles from said storage devices; switching means, selectively actuatable for actuating any said releasing means; registering means and electrical connections therefrom to said releasing means and operable by said releasing means to register the value of each article selected; adding means and electrical connections therefrom to said registering means and controlled thereby to totalize the values of a plurality of articles selected; indicating means and connections therefrom to said adding means, for indicating the totalized values thereof; and means including an electrical contact device, operably for actuating said indicating means.

2. A system for dispensing articles of varied character, comprising: a plurality of storage devices, each including an electrically operated releasing means, for dispensing stored articles from said storage devices; means for selectively actuating any said releasing means; registering means and electrical connections therefrom to each of said releasing means and operable by said releasing means to register the value of each article selected; adding means and electrical connections therefrom to said registering means for progressively totalizing the values of a plurality of articles dispensed; indicating means and connections therefrom to said adding means, operable to indicate the totalized values of said dispensed articles, and means including an electrical contact device operable to actuate said indicating means.

3. A system for dispensing articles of varied character, comprising: a plurality of storage devices, each including an electrically operated releasing means, for dispensing stored articles from said storage devices; switching means for selectively actuating any said releasing means; registering means and electrical connections therefrom to said releasing means and operable by said releasing means to register the value of each article selected; adding means and electrical connections therefrom to said registering means to add progressively the values of a plurality of articles released by said releasing means; and indicating means and connections therefrom to said adding means to indicate the progressive sum of the values of said articles.

4. A system for dispensing articles of varied character, comprising: a plurality of storage devices, each including an electrically operated releasing means; switching means for selectively actuating any said releasing means; registering means and electrical connections therefrom to said releasing means and operable by said releasing means to register the value of each article selected; adding means and electrical connections therefrom to said registering means for progressively totalizing the values of a plurality of articles selected by said switching means; indicating means and connections therefrom to said adding means to indicate the progressive sum of the values of said articles; and means operable at any stage of selection for releasing said registering, adding and indicating means, thereby restoring said system to its normal status.

5. A system for dispensing articles of varied character, comprising: a plurality of storage devices, each including an electrically operated releasing means, for dispensing stored articles from said storage devices; switching means for selectively actuating any said releasing means; registering means and electrical connections therefrom to said releasing means and operable by said releasing means to register the value of each article selected; adding means and electrical connections therefrom to said registering means, to add up progressively the values of a plurality of selected articles; indicating means and connections therefrom to said adding means to indicate the progressive sum of the values of said articles; relay means operable after the selection of a batch of articles to return said adding means to their initial position; and an indicating register and electrical connections therefrom to said adding means to totalize and indicate the values of all dispensed articles.

6. A system according to claim 5 including a plurality of additional indicating registers and connections therefrom through switching means to said adding means, said switching means being operable to connect any said additional indicating registers to said adding means for operation thereby.

7. A system for dispensing articles of varied character, comprising: a plurality of storage devices arranged in groups, each of said storage devices including an electrically operated releasing means; switching means for selectively actuating any said releasing means; registering means and electrical connections therefrom to said releasing means and operable by said releasing means to register the value of each article selected; adding means and electrical connections therefrom to said registering means, to add up progressively the values of a plurality of selected articles; an indicating register and connections therefrom to said adding means, for registering and indicating the progressive sum of the values of said articles dispensed; and additional indicating registers and connections therefrom to said adding means and to the switching means actuating the releasing means of at least one of said groups of storage devices, to register and indicate the sum of the values of articles selected from said group of storage devices.

8. A system for dispensing articles of varied character, comprising: a plurality of storage devices, each including an electrically operated releasing means; switching means for selectively actuating any said releasing means; registering means responsive to selection of any said releasing means for registering the value of each article selected; adding means responsive to said registering means, to add up progressively the values of a plurality of selected articles, said registering and adding means including for each monetary unit symbol occurring in the value of an article dispensed by said system, a relay group, stepping selector switching means and connections therefrom to said relay group; further switching means and connections therefrom to the stepping selector switching means of one monetary unit symbol and to further stepping selector switching means of the next higher monetary unit symbol to operate said further stepping selector switching means when the sum of the values added up by said first stepping selector switching means has reached a value of said next higher monetary unit symbol; and indicating means and connections therefrom to said stepping selector switching means to indicate the progressive sum of the values of said articles.

9. A system according to claim 8 wherein said adding means includes for a monetary unit symbol higher than said monetary unit symbols occurring in the values of any of said articles, additional stepping selector switching means, additional switching means and connections therefrom to the stepping selector switching means of the highest monetary unit symbol occurring in the value of said articles and to said additional stepping selector switching means to operate said additional stepping selector switching means when the sum of the values added up by said stepping selector switching means has reached a value of said higher monetary unit symbol; and connections from said additional stepping selector switching means to said indicating means.

10. A system according to claim 8 wherein said adding means includes a plurality of stepping selector switching means for the same monetary unit symbol; and alarm means and connections therefrom to each of said stepping selector switching means, said alarm means being operated when said stepping selector switching means fall out of step.

11. A system according to claim 7 wherein said adding means and indicating registers include a plurality of identical and simultaneously operated devices.

THOMAS S. SKILLMAN.

REFERENCES CITED

The following references are of record in the file of this patent:

UNITED STATES PATENTS

| Number | Name | Date |
|---|---|---|
| 1,744,771 | Julius | Jan. 28, 1930 |
| 1,938,526 | Limb | Dec. 5, 1933 |
| 1,981,783 | De Bussey | Nov. 20, 1934 |
| 2,063,962 | Turck | Dec. 15, 1936 |
| 2,276,293 | Farmer | Mar. 17, 1942 |
| 2,276,294 | Farmer | Mar. 17, 1942 |
| 2,353,002 | Armbruster | July 4, 1944 |
| 2,374,537 | Goldsmith | Apr. 24, 1945 |
| 2,416,870 | Farmer | Mar. 4, 1947 |